US009617447B2

(12) United States Patent
Jahns et al.

(10) Patent No.: US 9,617,447 B2
(45) Date of Patent: Apr. 11, 2017

(54) USE OF MULTI-STAGE POLYMERIZATE DISPERSIONS TO COAT METAL SHEETS

(71) Applicant: BASF SE, Ludwigshafen (DE)

(72) Inventors: Ekkehard Jahns, Weinheim (DE); Hans-Juergen Denu, Friedelsheim (DE); Sebastian Roller, Mannheim (DE); Alexander Kurek, Thierhaupten (DE)

(73) Assignee: BASF SE, Ludwigshafen (DE)

( * ) Notice: Subject to any disclaimer, the term of this patent is extended or adjusted under 35 U.S.C. 154(b) by 171 days.

(21) Appl. No.: 14/403,824

(22) PCT Filed: Jun. 4, 2013

(86) PCT No.: PCT/EP2013/061504
§ 371 (c)(1),
(2) Date: Nov. 25, 2014

(87) PCT Pub. No.: WO2013/182571
PCT Pub. Date: Dec. 12, 2013

(65) Prior Publication Data
US 2015/0104658 A1    Apr. 16, 2015

(30) Foreign Application Priority Data
Jun. 5, 2012 (EP) .................................. 12170841

(51) Int. Cl.
| | | |
|---|---|---|
| B32B 15/08 | (2006.01) | |
| C09D 151/00 | (2006.01) | |
| C04B 41/00 | (2006.01) | |
| C08F 265/06 | (2006.01) | |
| B05D 1/14 | (2006.01) | |
| B05D 1/36 | (2006.01) | |
| E04D 1/18 | (2006.01) | |
| E04D 1/22 | (2006.01) | |
| E04D 13/00 | (2006.01) | |
| C08F 2/24 | (2006.01) | |
| E04D 1/00 | (2006.01) | |

(52) U.S. Cl.
CPC ........... *C09D 151/003* (2013.01); *B05D 1/14* (2013.01); *B05D 1/36* (2013.01); *C04B 41/00* (2013.01); *C08F 265/06* (2013.01); *E04D 1/18* (2013.01); *E04D 1/22* (2013.01); *E04D 13/00* (2013.01); *C08F 2/24* (2013.01); *E04D 2001/005* (2013.01); *Y10T 428/31692* (2015.04)

(58) Field of Classification Search
CPC ................. C08F 265/06; C08F 220/18; C08F 2220/1825; E04D 13/00; E04D 1/22; E04D 1/18; B05D 1/36; C09D 151/003
See application file for complete search history.

(56) References Cited

U.S. PATENT DOCUMENTS

| | | | |
|---|---|---|---|
| 4,226,007 A | 10/1980 | Duenser | |
| 4,269,749 A | 5/1981 | Marriott et al. | |
| 5,356,968 A | 10/1994 | Rupaner et al. | |
| 2009/0069495 A1 | 3/2009 | Fichtner et al. | |
| 2009/0203814 A1 | 8/2009 | Petri et al. | |
| 2012/0196972 A1* | 8/2012 | Balk ..................... | C08F 265/06 524/521 |

FOREIGN PATENT DOCUMENTS

| | | |
|---|---|---|
| DE | 2 061 213 | 6/1971 |
| DE | 2 207 209 | 10/1972 |
| DE | 2 164 256 | 6/1973 |
| DE | 27 22 097 | 11/1978 |
| DE | 30 47 374 A1 | 10/1981 |
| DE | 38 27 975 A1 | 3/1990 |
| DE | 39 01 073 | 7/1990 |
| DE | 196 24 299 A1 | 1/1997 |
| DE | 196 21 027 A1 | 11/1997 |
| DE | 197 41 184 A1 | 3/1999 |
| DE | 197 41 187 A1 | 3/1999 |
| DE | 198 05 122 A1 | 4/1999 |
| DE | 198 28 183 A1 | 12/1999 |
| DE | 198 39 199 A1 | 3/2000 |
| DE | 198 40 586 A1 | 3/2000 |
| DE | 198 47 115 C1 | 5/2000 |
| DE | 10 2005 032 194 A1 | 1/2007 |
| EP | 0 417 568 A2 | 3/1991 |
| EP | 0 557 694 A1 | 9/1993 |
| EP | 0 623 659 A2 | 11/1994 |
| EP | 0 771 328 | 5/1997 |
| EP | 2 017 313 A1 | 1/2009 |

(Continued)

OTHER PUBLICATIONS

STIC Search Report dated Jul. 6, 2016.*

(Continued)

*Primary Examiner* — Eisa Elhilo
(74) *Attorney, Agent, or Firm* — Oblon, McClelland, Maier & Neustadt, L.L.P.

(57) ABSTRACT

The present invention relates to the use of aqueous multi-stage polymer dispersions obtainable by free-radically initiated aqueous emulsion polymerization, having a soft phase and a hard phase and having a hard-to-soft stage ratio of 25% to 95% by weight to 75% to 5% by weight, the glass transition temperature (Tg) of the soft phase, as first stage, being −30 to 0° C. and that of the hard phase, as second stage, being 20 to 60° C., comprising at least one monomer of the general formula I (I)

$$\begin{array}{c} R1 \\ \diagup \\ = \\ \diagdown \\ C(=O)-X-\underset{R2}{\underset{|}{C}}(\underset{R3}{\overset{|}{\phantom{C}}})-[\phantom{C}]_n-SO_3^-Y^+ \end{array}$$

in which the variables have the following definitions:
n=0 to 2,
R1, R2, R3=independently of one another hydrogen or methyl group,
X=O or NH,
Y=H, alkali metal or NH$_4$,
to coat metal sheets.

13 Claims, No Drawings

(56) References Cited

FOREIGN PATENT DOCUMENTS

| | | |
|---|---|---|
| WO | WO 93/25588 A1 | 12/1993 |
| WO | WO 95/33775 A1 | 12/1995 |
| WO | WO 2011/009838 A2 | 1/2011 |

OTHER PUBLICATIONS

International Search Report issued Jul. 26, 2013 in PCT/EP2013/061504.
International Preliminary Report on Patentability and Written Opinion issued Jul. 26, 2013 in PCT/EP2013/061504 (with English Translation of Category of Cited Documents).

* cited by examiner

USE OF MULTI-STAGE POLYMERIZATE DISPERSIONS TO COAT METAL SHEETS

The present invention relates to the use of aqueous multistage polymer dispersions obtainable by free-radically initiated aqueous emulsion polymerization, having a soft phase and a hard phase and having a hard-to-soft stage ratio of 25% to 95% by weight to 75% to 5% by weight, the glass transition temperature (Tg) of the soft phase, as first stage, being −30 to 0° C. and that of the hard phase, as second stage, being 20 to 60° C., comprising at least one monomer of the general formula I

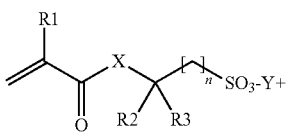

in which the variables have the following definitions:
n=0 to 2,
R1, R2, R3=independently of one another hydrogen or methyl group,
X=O or NH,
Y=H, alkali metal or $NH_4$,
to coat metal sheets.

The present invention further relates to metal sheets comprising the polymer dispersion of the invention, and to methods for producing the coated metal sheets.

Prior-art aqueous polymer dispersions are used as binders in coating compositions, especially also for the coating of metal sheets for roof covering and as wall cladding. These metal sheets as construction materials consist for example of aluminum, zinc, copper or steel sheet, provided with a corrosion protection primer comprising organic binders and anticorrosion pigments, such as zinc phosphate, aluminum triphosphate, zinc orthophosphate hydrate, zinc aluminum orthophosphate hydrate, zinc molybdenum orthophosphate hydrate, zinc aluminum molybdenum orthophosphate hydrate, and zinc calcium strontium aluminum orthophosphate silicate hydrate, for example. These sheets are often produced by the process referred to as coil coating. In that process, the metal sheets, from a roll, are provided with the corrosion protection primer, are dried or cured, and are subsequently rolled up again on a virtually continuous basis. From these coils thus coated, metal sheets for roof and wall constructions are shaped by trimming and bending machines. These metal sheets may then once again be provided with a weather-resistant final coating.

The metal sheets may also be shaped from pre-cut metal plates, and coated.

The formed metal sheets, for an alternative visual appearance, may also be used with a granulated surface. As well as its different visual impression, this surface also serves to dampen noise from rain. Furthermore, snow slippage is prevented. For their production, pre-prepared coil sheet (with and without primer) is cold-formed into the corresponding roofing elements. The surface is subsequently coated with a paint layer 100-800 μm thick. Granules are scattered directly into this paint coating while it is still wet. Nonadhering material is blown off with a stream of air. This layer of granules is immediately thereafter fixed with a second paint layer or with a transparent clearcoat. This is followed by a final drying operation at elevated temperature. Important factors for the coating, in addition to the weather resistance and durable adhesiveness in operation, include processing requirements on the construction site. These include the adhesion of the coating to the metal sheet under both dry and wet conditions. Adaptations of the elements in the course of their laying on the construction site are tested in tests of flexural properties, among others. In such tests, the elements are bent under dry conditions at −10° C. by up to 180°. Processing is also simulated by means of a nail test, and by further mechanical stressing.

It is a disadvantage if, in these tests, the coating detaches or cracks form, especially in the bending region. It is also appropriate to prevent parts of the coating separating or delaminating completely from the substrate, whether these parts be the final coating, the granules, or the first paint coating.

Increased tackiness of the coating at elevated temperatures as a result of the addition of plasticizers is a disadvantage. In the exterior segment, it leads to increased dirt acquisition and, as a result, to increased overgrowth by algae and mosses. Likewise, the water sensitivity of the coating is increased. Leaching of ingredients may constitute a further problem.

In order to avoid the aforementioned disadvantageous qualities, the corrosion-protected metal sheets are frequently provided with a coating. For this purpose it is nowadays usual to use aqueous coating systems comprising an aqueous polymer dispersion as film-forming constituent. In the present state of the art, single-stage binders are generally used, based on aqueous polymer dispersions, for masonry paints, comprising styrene-acrylates, homopolymers and copolymers of vinyl acetate, or straight acrylics in paint formulas for the fixing of the granules (cf., e.g., DE 21 64 256). The coatings obtainable therewith have, however, been unable to prevent the disadvantage of the low adhesion and elasticity when bending by up to 180° and at low temperatures. These binders, with a glass transition temperature (Tg) in the range of 10-35° C., are therefore filmed by the addition of film-forming assistants and plasticizers to the formulations. The plasticizers raise the flexibility at low temperatures, such as at −10° C., for example, and thus allow the sheets to be bent by up to 180° without cracking or delamination from the substrate.

EP 623 659 discloses multistage polymer dispersions and the use thereof in coating compositions. The dispersions disclosed therein, however, do not comprise a monomer of the general formula I and do not describe the coating of metal sheets.

None of the multistage polymers disclosed in the prior art comprises a monomer of the general formula I and is used to coat metal sheets.

The single-stage binders in prior-art coatings have the disadvantage that they are often too hard to achieve effective blocking resistance and therefore cannot be formulated without solvents or film-forming assistants. Under outdoor weathering conditions, these coatings may easily acquire cracks and become matt, and so they do not have very good weathering resistance.

While the two-stage binders of the prior art, as described in EP 623 659, for example, do provide satisfactory blocking resistance, as a result of the hard-phase fraction therein, their weathering resistance, however, is not up to the requirements.

It was an object of the present invention, accordingly, to provide binders and also coating compositions, more particularly for the coating of granulated and nongranulated metal sheets, such as aluminum or steel sheets, which exhibit increased weather resistance and, moreover, feature excellent blocking resistance and outstanding adhesion and elasticity.

Surprisingly it has been found that multistage polymer dispersions obtainable by free-radically initiated aqueous emulsion polymerization, having a soft phase and a hard phase and having a hard-to-soft stage ratio of 25% to 95% by weight to 75% to 5% by weight (based on polymer mass), the glass transition temperature of the soft phase, as first stage, being −30 to 0° C. and that of the hard phase, as second stage, being 20 to 60° C., comprising at least one monomer of the general formula I

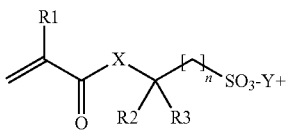

(I)

in which the variables have the following definitions:
n=0 to 2,
R1, R2, R3=independently of one another hydrogen or methyl group,
X=O or NH,
Y=H, alkali metal, $NH_4$,
lead to coatings having increased weather resistance, in conjunction with excellent adhesion and elasticity.

The binder generation of the invention enables optimally improved adhesion under all test conditions without extra use of plasticizers and the attendant drawbacks. The coatings using the binders of the invention adhere better and at elevated temperatures are less sensitive to mechanical exposure. Tests at low temperatures and under wet conditions show plus points in terms of adhesion. Weather resistance and long-term adhesiveness are likewise improved.

Substrates suitable include metal sheets of aluminum, zinc, copper or steel, and also industrially pretreated "coils" or downstream products of these, in the form of flat or shaped metal sheets or trimmed metal-sheet strips. The improved weather resistance is attributable to exceptionally good filming (low MFFT) in conjunction with relatively high film hardness, and is apparent, for example, in enhanced gloss retention after UV/water exposure (e.g., Suntest/Xenotest or outdoor weathering) for clear varnishes or coatings with low levels of pigmentation, or by good shade stability (color retention) in the case of more highly pigmented coatings. As well as the good weather resistance, the systems show excellent blocking resistance and outstanding adhesion and elasticity.

The metal sheets may be used in granulated or "nongranulated" form.

The coating of the invention may be applied by dipping, spraying, rolling or brushing or by means of what is known as a "curtain coater".

For the production of profiled metal roofing elements, pre-prepared coil sheet (with and without primer) is cold-formed into the corresponding roofing elements. Subsequently the surface is coated with a paint layer 100-800 μm thick, comprising the polymer dispersion of the invention. The paint layer may also be admixed with fillers (calcium carbonates, silicates, etc.), pigments (iron oxides, chromium oxides, carbon black, etc.), and additives such as wetting agents, defoamers, and thickeners. To produce granulated metal sheets, granules may be scattered directly into this paint coating while it is still wet. Nonadhering material is blown off with a stream of air. The granules typically comprise a silicatic material, coated with a pigment depending on application.

This layer of granules is immediately thereafter fixed with a second paint layer, comprising the binder of the invention, or with a transparent clearcoat (150-180 $g/m^2$).

The clearcoat may comprise the polymer dispersion of the invention or else may be a straight acrylic with high UV resistance.

After that there is a final drying operation at elevated temperature (50-90° C., with and without air circulation).

After coating and drying, usually in a state in which they are still hot, the sheets are stacked on one another.

The polymer dispersion of the invention may therefore be used in the basecoat, this being the first paint coat on the primed metal, which binds the granules, or else in a second paint coating and/or in a UV-stable topcoat (clearcoat).

The aqueous multistage polymer dispersion used in accordance with the invention is understood preferably to be an aqueous polymer dispersion whose soft phase, as first stage, has a Tg of −30 to 0° C., preferably of −20 to 0° C., and whose hard phase, as second stage, has a Tg of 20 to 60° C., preferably of 30 to 50° C., and a hard-to-soft stage ratio of 25-95:75-5.

The granulated or nongranulated metal sheets of the invention are understood to be sheets of aluminum, zinc, copper or steel. The metal sheets can be shaped into roofing parts, and coated in the process described above.

The present invention further relates to a method for producing the metal sheets coated in accordance with the invention.

Further provided by the invention are granulated or nongranulated metal sheets which are coated with the aqueous polymer dispersion of the invention.

The polymer dispersions used in accordance with the invention are obtainable by free-radical emulsion polymerization of ethylenically unsaturated compounds (monomers). In the first stage a polymer is prepared from monomers which comprise at least one monomer I and also, optionally, a monomer having at least one acid group, in an amount of 0.1 part by weight, preferably of 0.5 to 2.5 parts by weight, based on the total amount of monomers of the first and second stages.

The acid monomers used in the first stage can be copolymerized with monomers without acid groups. The polymer of the first stage is preferably formed from at least 40% by weight of nonionic principal monomers, defined in more detail below, and also from a second kind of monomer, selected from ethylenically unsaturated acid monomers. The polymer of the first stage may, furthermore, optionally be formed from further, preferably nonionic, monomers. The polymer of the first stage is preferably composed to an extent of at least 40% by weight, more particularly from 60% to 99% by weight or from 80% to 98% by weight, based on all of the monomers of the first stage, of principal monomers which are selected from the group consisting of C1 to C20 alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, and mixtures of these monomers. Principal monomers for the polymer of the first stage are, for example, (meth)acrylic acid alkyl esters having a $C_1$-$C_{10}$ alkyl radical, such as methyl methacrylate, methyl acrylate, n-butyl acrylate, ethyl acrylate, and 2-ethylhexyl acrylate. Also suitable in particular are mixtures of the (meth)acrylic acid alkyl esters. Vinyl esters of carboxylic acids having 1 to 20 C atoms are, for example, vinyl laurate, vinyl stearate, vinyl propionate, Versatic acid vinyl esters, and vinyl acetate. Suitable vinylaromatic compounds include vinyltoluene, alpha- and para-methylstyrene, alpha-butylstyrene, 4-n-butylstyrene, 4-n-decylstyrene, and, preferably, styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Examples of vinyl ethers include vinyl methyl ether and vinyl isobutyl ether. Vinyl ethers of alcohols comprising 1 to 4 C atoms are preferred. Hydrocarbons having 4 to 8 C atoms and two olefinic double bonds include butadiene, isoprene, and chloroprene. Preferred principal monomers for the polymer of the first stage are C1 to C10 alkyl acrylates, C1 to C10 alkyl methacrylates, vinyl esters of carboxylic acids comprising up to 20 C atoms, and mixtures of these monomers, more particularly $C_1$ to $C_8$ alkyl acrylates and $C_1$ to $C_8$ alkyl methacrylates and vinyl esters. Especially preferred are 2-ethylhexyl acrylate, butyl acrylate, methyl methacrylate, and styrene.

The polymer of the first stage further comprises optionally 0.1%, more particularly from 0.5% to 2.5%, by weight, based on all of the monomers of the first stage, of ethylenically unsaturated acid monomers. Examples of ethylenically unsaturated acid monomers are ethylenically unsaturated carboxylic acids, ethylenically unsaturated sulfonic acids, and vinylphosphonic acid. Ethylenically unsaturated carboxylic acids used are preferably alpha,beta-monoethylenically unsaturated monocarboxylic and dicarboxylic acids having 3 to 6 C atoms in the molecule. Examples of such are acrylic acid, methacrylic acid, itaconic acid, maleic acid, fumaric acid, crotonic acid, vinylacetic acid, vinyllactic acid, and 2-carboxyethyl acrylate. Examples of ethylenically unsaturated sulfonic acids include vinylsulfonic acid and styrenesulfonic acid. Preference is given to acrylic acid and methacrylic acid or a mixture thereof.

As monomers of the first stage, use may additionally be made of the amides and the hydroxyalkyl esters of $\alpha,\beta$-unsaturated $C_3$-$C_6$ carboxylic acids, more preferably acrylamide, methacrylamide, 2-hydroxyethyl acrylate, 2-hydroxyethyl methacrylate, 2-hydroxypropyl(meth)acrylate or 1,4-butanediol monoacrylate. The monomers can be used individually or else in combinations of, for example, acids and amides.

As monomers of the first stage use is made additionally of monomers of the general formula I
These monomers comprehend, for example:
2-acrylamido-2-methylpropanesulfonic acid (AMPS)
methacrylic acid 3'-sulfopropyl ester
acrylic acid 3'-sulfopropyl ester
methacrylic acid 2'-sulfoethyl ester.
Among the alkali metal salts of the monomers of the general formula I, suitability is possessed more particularly by the sodium, ammonium, and potassium metal salts.

In one preferred embodiment the polymer of the first stage is a copolymer which
(i) is used in an amount of 5% to 50% by weight, based on 100 parts by weight of the total monomers to be polymerized in the first and second stages, and which
(ii) is composed to an extent of at least 80% and up to 99% by weight of principal monomers selected from the group consisting of C1 to C10 alkyl (meth)acrylates, amides and hydroxyalkyl esters of $\alpha,\beta$-unsaturated $C_3$-$C_6$ carboxylic acids, more preferably acrylamide, methacrylamide, 2-hydroxyethyl acrylate, 2-hydroxyethyl methacrylate, 2-hydroxypropyl(meth)acrylate or 1,4-butanediol monoacrylate, and mixtures of these monomers, in particular n-butyl acrylate, methyl methacrylate, and acrylamide, and
(iii) to an extent of at least 0.1% and up to 5% by weight of monomers I, which are preferably selected from the group of
2-acrylamido-2-methylpropanesulfonic acid (AMPS), methacrylic acid 3'-sulfopropyl ester,
acrylic acid 3'-sulfopropyl ester, and
methacrylic acid 2'-sulfoethyl ester.

In one preferred embodiment of the invention, the polymerization of the first stage takes place in the presence of seed latex. Seed latex is an aqueous dispersion of finely divided polymer particles having an average particle diameter of preferably 20 to 40 nm. Seed latex is used in an amount of preferably 0.05% to 5% by weight, more preferably of 0.1% to 3% by weight, based on the total monomer amount of the first and second stages. Suitability is possessed, for example, by a latex based on polystyrene or based on polymethyl methacrylate. A preferred seed latex is polystyrene seed.

The monomers used for the polymerization of the second stage are composed preferably to an extent of at least 60% by weight, more preferably at least 80% by weight, e.g., from 80% to 100% by weight, more preferably of at least 95% by weight, based on the total amount of monomers of the second stage, of one or more of the principal monomers described below. The principal monomers are selected from the group consisting of $C_1$-$C_{20}$ alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers.

Examples include (meth)acrylic acid alkyl esters having a $C_1$-$C_{10}$ alkyl radical, such as methyl methacrylate, methyl acrylate, n-butyl acrylate, n-butyl methacrylate, ethyl acrylate, and 2-ethylhexyl acrylate. Also suitable in particular are mixtures of the (meth)acrylic acid alkyl esters. Vinyl esters of carboxylic acids having 1 to 20 C atoms are, for example, vinyl laurate, vinyl stearate, vinyl propionate, Versatic acid vinyl esters, and vinyl acetate. Suitable vinylaromatic compounds include vinyltoluene, alpha- and para-methylstyrene, alpha-butylstyrene, 4-n-butylstyrene, 4-n-decylstyrene, and, preferably, styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Examples of vinyl ethers include vinyl methyl ether and vinyl isobutyl ether. Preference is given to vinyl ethers of alcohols comprising 1 to 4 C atoms. Hydrocarbons having 4 to 8 C atoms and two olefinic double bonds include butadiene, isoprene, and chloroprene.

Preferred principal monomers for the polymerization of the second stage are the $C_1$ to $C_{10}$ alkyl acrylates and $C_1$ to $C_{10}$ alkyl methacrylates, more particularly $C_1$ to C8 alkyl acrylates and $C_1$ to $C_{10}$ alkyl methacrylates, and vinylaromatics, more particularly styrene, and mixtures thereof. Especially preferred are methyl acrylate, methyl methacrylate, ethyl acrylate, n-butyl acrylate, n-butyl methacrylate, n-hexyl acrylate, octyl acrylate, 2-ethylhexyl acrylate, 2-propylheptyl acrylate, styrene, vinyl acetate, and mixtures of these monomers.

Besides the principal monomers, the monomers for the polymerization of the second stage may comprise further monomers, examples being monomers with carboxylic acid, sulfonic acid or phosphonic acid groups. Carboxylic acid groups are preferred. Examples include acrylic acid, methacrylic acid, itaconic acid, maleic acid, and fumaric acid. Further monomers are, for example, also monomers comprising hydroxyl groups, especially $C_1$-$C_{10}$ hydroxyalkyl (meth)acrylates, and also (meth)acrylamide. As further monomers, mention may additionally be made of phenyloxyethylglycol mono(meth)acrylate, glycidyl acrylate, glycidyl methacrylate, and amino(meth)acrylates such as 2-aminoethyl(meth)acrylate. Further monomers that may be mentioned include crosslinking monomers.

The polymer of the second stage further comprises optionally 0.1%, more particularly from 0.5% to 2.5%, by weight, based on all of the monomers of the second stage, of ethylenically unsaturated acid monomers. Ethylenically unsaturated acid monomers are, for example, ethylenically unsaturated carboxylic acids, ethylenically unsaturated sulfonic acids, and vinylphosphonic acid. As ethylenically unsaturated carboxylic acids it is preferred to use alpha, beta-monoethylenically unsaturated monocarboxylic and dicarboxylic acids having 3 to 6 C atoms in the molecule. Examples of such are acrylic acid, methacrylic acid, itaconic acid, maleic acid, fumaric acid, crotonic acid, vinylacetic acid, vinyllactic acid, and 2-carboxyethyl acrylate. Examples of suitable ethylenically unsaturated sulfonic acids include vinylsulfonic acid and styrenesulfonic acid. Preference is given to acrylic acid and methacrylic acid and a mixture thereof.

As monomers of the second stage it is additionally possible to use the amides and the hydroxyalkyl esters of $\alpha,\beta$-unsaturated $C_3$-$C_6$ carboxylic acids, more preferably acrylamide, methacrylamide, 2-hydroxyethyl acrylate, 2-hydroxyethyl methacrylate, 2-hydroxypropyl(meth)acrylate or 1,4-butanediol monoacrylate. The monomers may be used individually or else in combinations of, for example, acids and amides.

As monomers of the second stage use is likewise made, furthermore, of monomers of the general formula I.
These monomers comprehend, for example:
2-acrylamido-2-methylpropanesulfonic acid (AMPS)
methacrylic acid 3'-sulfopropyl ester
acrylic acid 3'-sulfopropyl ester
methacrylic acid 2'-sulfoethyl ester.

Among the alkali metal salts of the monomers of the general formula I, suitability is possessed more particularly by the sodium, ammonium, and potassium metal salts.

The monomers for the polymerization of the second stage are selected in particular to an extent of at least 60% by weight, more preferably at least 80% by weight, e.g., from 60% to 99% by weight, and very preferably at least 95% by weight, from at least one $C_1$ to $C_{20}$ alkyl acrylate, at least one $C_1$ to $C_{20}$ alkyl methacrylate, a mixture thereof, or a mixture thereof with at least one further monomer selected from amides and the hydroxyalkyl esters of $\alpha,\beta$-unsaturated $C_3$-$C_6$ carboxylic acids, more preferably acrylamide, methacrylamide, 2-hydroxyethyl acrylate, 2-hydroxyethyl methacrylate, 2-hydroxypropyl(meth)acrylate or 1,4-butanediol monoacrylate.

The monomers for the polymerization of the first stage are selected such that the glass transition temperature calculated for a polymer prepared from the monomers of the first stage is $-30°$ C. to $0°$ C., and the glass transition temperature calculated for a polymer prepared from the monomers of the second stage is $20°$ C. to $60°$ C.

Through skillful variation in the nature and amount of the monomers it is possible for the skilled person, in accordance with the invention, to prepare aqueous polymer compositions whose polymers have a glass transition temperature within the desired range. Range finding is possible by means of the Fox equation. According to Fox (T. G. Fox, Bull. Am. Phys. Soc. 1956 [Ser. II] 1, page 123 and in accordance with Ullmann's Encyclopädie der technischen Chemie, volume 19, page 18, 4th edition, Verlag Chemie, Weinheim, 1980), the glass transition temperature of copolymers can be calculated in good approximation as follows:

$$1/T_g = x^1/T_g^1 + x^2/T_g^2 \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures of the polymers synthesized in each case only from one of the monomers 1, 2, ... n, in degrees Kelvin. The $T_g$ values for the homopolymers of the majority of monomers are known and are listed in, for example, Ullmann's Encyclopedia of Industrial Chemistry, volume A 21, 5th edition, page 169, VCH Weinheim, 1992; other sources of homopolymer glass transition temperatures include, for example, J. Brandrup, E. H. Immergut, Polymer Handbook, $1^{st}$ Ed., J. Wiley, New York 1966, $2^{nd}$ Ed. J. Wiley, New York 1975, and $3^{rd}$ Ed. J. Wiley, New York 1989. For ethyl acrylate a figure of $-13°$ C. is used.

The actual glass transition temperature can be determined by means of differential scanning calorimetry (ASTM D 3418-08, midpoint temperature).

The weight ratio of the amount of monomers used in the first stage to the amount of monomers used in the second stage is 25-95:75-5, preferably from 5:95 to 50:50.

In the preparation of the polymer dispersions of the invention it is possible to use at least one crosslinker in addition to the aforementioned monomers. Monomers which possess a crosslinking function are compounds having at least two polymerizable, ethylenically unsaturated, nonconjugated double bonds in the molecule. Crosslinking can also be accomplished, for example, by means of functional groups which are able to enter into a chemical crosslinking reaction with complementary functional groups. In that case the complementary groups may both be attached to the emulsion polymer or for the crosslinking it is also possible to use a crosslinker which is capable of being able to enter into a chemical crosslinking reaction with functional groups of the emulsion polymer.

Suitable crosslinkers are, for example, acrylic esters, methacrylic esters, allyl ethers or vinyl ethers of at least dihydric alcohols. The OH groups of the parent alcohols may be wholly or partly etherified or esterified; the crosslinkers, however, comprise at least two ethylenically unsaturated groups.

Examples of the parent alcohols are dihydric alcohols such as 1,2-ethanediol, 1,2-propanediol, 1,3-propanediol, 1,2-butanediol, 1,3-butanediol, 2,3-butanediol, 1,4-butanediol, but-2-ene-1,4-diol, 1,2-pentanediol, 1,5-pentanediol, 1,2-hexanediol, 1,6-hexanediol, 1,10-decanediol, 1,2-dodecanediol, 1,12-dodecanediol, neopentyl glycol, 3-methylpentane-1,5-diol, 2,5-dimethyl-1,3-hexanediol, 2,2,4-trimethyl-1,3-pentanediol, 1,2-cyclohexanediol, 1,4-cyclohexanediol, 1,4-bis(hydroxymethyl)cyclohexane, hydroxypivalic acid neopentyl glycol monoester, 2,2-bis(4-hydroxyphenyl)propane, 2,2-bis[4-(2-hydroxypropyl)phenyl]propane, diethylene glycol, triethylene glycol, tetraethylene glycol, dipropylene glycol, tripropylene glycol, tetrapropylene glycol, 3-thiapentane-1,5-diol, and also polyethylene glycols, polypropylene glycols, and polytetrahydrofurans having molecular weights of in each case 200 to 10 000. Besides the homopolymers of ethylene oxide or propylene oxide it is also possible to use block copolymers of ethylene oxide or propylene oxide, or copolymers which incorporate ethylene oxide and propylene oxide groups. Examples of parent alcohols having more than two OH groups are trimethylolpropane, glycerol, pentaerythritol, 1,2,5-pentanetriol, 1,2,6-hexanetriol, cyanuric acid, sorbitan, sugars such as sucrose, glucose, and mannose. The polyhydric alcohols can of course also be used, following reaction with ethylene oxide or propylene oxide, in the form of the corresponding ethoxylates or propoxylates. The polyhydric alcohols can also first be converted to the corresponding glycidyl ethers by reaction with epichlorohydrin.

Additional suitable crosslinkers are the vinyl esters or the esters of monohydric, unsaturated alcohols with ethylenically unsaturated $C_3$-$C_6$ carboxylic acids, examples being acrylic acid, methacrylic acid, itaconic acid, maleic acid or fumaric acid. Examples of such alcohols are allyl alcohol, 1-buten-3-ol, 5-hexen-1-ol, 1-octen-3-ol, 9-decen-1-ol, dicyclopentenyl alcohol, 10-undecen-1-ol, cinnamyl alcohol, citronellol, crotyl alcohol or cis-9-octadecen-1-ol. An alternative option is to esterify the monohydric, unsaturated alcohols with polybasic carboxylic acids, examples being malonic acid, tartaric acid, trimellitic acid, phthalic acid, terephthalic acid, citric acid or succinic acid. A preferred crosslinker is allyl methacrylate.

Other suitable crosslinkers are esters of unsaturated carboxylic acids with the above-described polyhydric alcohols, examples being those of oleic acid, crotonic acid, cinnamic acid or 10-undecenoic acid.

Suitable crosslinkers, furthermore, are straight-chain or branched, linear or cyclic, aliphatic or aromatic hydrocarbons which possess at least two double bonds, which in the case of aliphatic hydrocarbons must not be conjugated, examples being divinylbenzene, divinyltoluene, 1,7-octadiene, 1,9-decadiene, 4-vinyl-1-cyclohexene, trivinylcyclohexane or polybutadienes having molecular weights of 200 to 20 000.

Further suitable crosslinkers are the acrylamides, methacrylamides, and N-allylamines of at least difunctional amines. Such amines are, for example, 1,2-diaminoethane, 1,3-diaminopropane, 1,4-diaminobutane, 1,6-diaminohexane, 1,12-dodecanediamine, piperazine, diethylenetriamine or isophoronediamine. Likewise suitable are the amides formed from allylamine and unsaturated carboxylic acids, such as acrylic acid, methacrylic acid, itaconic acid, maleic acid, or at least dibasic carboxylic acids, of the kind described above.

Furthermore, triallylamine and triallylmonoalkylammonium salts, e.g., triallylmethylammonium chloride or triallylmethylammonium methylsulfate, are suitable as crosslinkers.

Also suitable are N-vinyl compounds of urea derivatives, at least difunctional amides, cyanurates or urethanes, such as of urea, ethyleneurea, propyleneurea or tartaramide, for example, such as N,N'-divinylethyleneurea or N,N'-divinylpropyleneurea.

Further suitable crosslinkers are divinyldioxane, tetraallylsilane or tetravinylsilane. It will be appreciated that mixtures of the aforementioned compounds can also be used. Preference is given to using water-soluble crosslinkers.

Further included among the crosslinking monomers are those which as well as an ethylenically unsaturated double bond contain a reactive functional group, such as an aldehyde group, a keto group or an oxirane group, able to react with an added crosslinker. The functional groups are preferably keto groups or aldehyde groups. The keto or aldehyde groups are preferably attached to the polymer through copolymerization of copolymerizable, ethylenically unsaturated compounds with keto or aldehyde groups. Suitable such compounds are acrolein, methacrolein, vinyl alkyl ketones having 1 to 20, preferably 1 to 10, carbon atoms in the alkyl radical, formylstyrene, (meth)acrylic acid alkyl esters having one or two keto or aldehyde groups or one aldehyde group and one keto group in the alkyl radical, the alkyl radical preferably comprising a total of 3 to 10 carbon atoms, examples being (meth)acryloxyalkylpropanals, as described in DE-A-2722097. Also suitable, furthermore, are N-oxoalkyl(meth)acrylamides of the kind known, for example, from U.S. Pat. No. 4,226,007, DE-A-2061213 or DE-A-2207209. Particularly preferred are acetoacetyl (meth)acrylate, acetoacetoxyethyl (meth)acrylate and, more particularly, diacetoneacrylamide. The crosslinkers are preferably a compound with at least 2 functional groups, more particularly 2 to 5 functional groups, which are able to enter into a crosslinking reaction with the functional groups of the polymer, especially the keto or aldehyde groups. Functional groups for the crosslinking of the keto or aldehyde groups include, for example, hydrazide, hydroxylamine or oxime ether or amino groups. Suitable compounds with hydrazide groups are, for example, polycarboxylic hydrazides having a molar weight of up to 500 g/mol. Particularly preferred hydrazide compounds are dicarboxylic dihydrazides having preferably 2 to 10 C atoms. Examples of such include oxalic dihydrazide, malonic dihydrazide, succinic dihydrazide, glutaric dihydrazide, adipic dihydrazide, sebacic dihydrazide, maleic dihydrazide, fumaric dihydrazide, itaconic dihydrazide and/or isophthalic dihydrazide. Of particular interest are the following: adipic dihydrazide, sebacic dihydrazide, and isophthalic dihydrazide. Suitable compounds with hydroxylamine or oxime ether groups are specified for example in WO 93/25588.

Other suitable crosslinkers, which may be used in the polymerization of the first stage, and in the second stage, and also thereafter, include, for example, acetoacetoxyalkyl (meth)acrylates, N-vinylpyrrolidone, N-(2-methacryloyloxyethyl)ethyleneurea, N-(2-acryloyloxyethyl)-ethyleneurea, 2-acetoacetoxyethyl acrylate, 2-acetoacetoxyethyl methacrylate, or diacetoneacrylamide.

The crosslinking component is used preferably in an amount of 0.0005% to 5%, more preferably 0.001% to 2.5%, more particularly 0.01% to 1.5%, by weight, based on the total weight of the monomers used for the polymerization (including the crosslinker). The crosslinkers may be used only in the first stage, only in the second stage, or else in both stages.

The free-radical polymerization of the monomer mixture M) may take place in the presence of at least one chain transfer agent. Such agents are used preferably in an amount of 0.0005% to 5%, more preferably of 0.001% to 2.5%, and more particularly of 0.01% to 1.5%, by weight, based on the total weight of the monomers used for the polymerization.

Chain transfer agent (CTA or polymerization regulator) is a general term for compounds having high transfer constants. CTAs accelerate chain transfer reactions to bring about a reduction in the degree of polymerization of the resultant polymers without affecting the overall reaction rate. CTAs may be subdivided into monofunctional, difunctional or polyfunctional agents, depending on the number of functional groups in the molecule that are able to lead to one or more chain transfer reactions. Suitable CTAs are described comprehensively, for example, by K. C. Berger and G. Brandrup in J. Brandrup, E. H. Immergut, Polymer Handbook, $3^{rd}$ edn., John Wiley & Sons, New York, 1989, pp. II/81-II/141.

Examples of suitable CTAs include aldehydes such as formaldehyde, acetaldehyde, propionaldehyde, n-butyraldehyde, and isobutyraldehyde.

Other CTAs which can also be used are as follows: formic acid, its salts or esters, such as ammonium formate, 2,5-diphenyl-1-hexene, hydroxylammonium sulfate, and hydroxylammonium phosphate.

Further suitable CTAs are halogen compounds, examples being alkyl halides such as tetrachloromethane, chloroform, bromotrichloromethane, bromoform, allyl bromide, and benzyl compounds such as benzyl chloride or benzyl bromide.

Further suitable CTAs are allyl compounds, such as allyl alcohol, functionalized allyl ethers, such as allyl ethoxylates, alkyl allyl ethers or glycerol monoallyl ether.

As CTAs it is preferred to use compounds comprising sulfur in bonded form.

Examples of compounds of this kind are inorganic hydrogensulfites, disulfites, and dithionites or organic sulfides, disulfides, polysulfides, sulfoxides, and sulfones. They include di-n-butyl sulfide, di-n-octyl sulfide, diphenyl sulfide, thiodiglycol, ethylthio-ethanol, diisopropyl disulfide, di-n-butyl disulfide, di-n-hexyl disulfide, diacetyl disulfide, diethanol sulfide, di-tert-butyl trisulfide, dimethyl sulfoxide, dialkyl sulfide, dialkyl disulfide and/or diaryl sulfide.

Suitable polymerization regulators further include thiols (compounds which acquire sulfur in the form of SH groups, also referred to as mercaptans). Preferred CTAs are mono-, di-, and polyfunctional mercaptans, mercapto alcohols and/or mercapto carboxylic acids. Examples of these compounds are allyl thioglycolates, ethyl thioglycolate, cysteine, 2-mercaptoethanol, 1,3-mercaptopropanol, 3-mercaptopropane-1,2-diol, 1,4-mercaptobutanol, mercaptoacetic acid, 3-mercaptopropionic acid, mercaptosuccinic acid, thioglycerol, thioacetic acid, thiourea, and alkyl mercaptans such as n-butyl mercaptan, n-hexyl mercaptan or tert- or n-dodecyl mercaptan.

Examples of difunctional CTAs, comprising two sulfur atoms in bonded form, are difunctional thiols such as, for example, dimercaptopropanesulfonic acid (sodium salt), dimercaptosuccinic acid, dimercapto-1-propanol, dimercaptoethane, dimercaptopropane, dimercaptobutane, dimercaptopentane, dimercaptohexane, ethylene glycol bisthioglycolates, and butanediol bisthioglycolate. Examples of polyfunctional CTAs are compounds which comprise more than two sulfur atoms in bonded form. Examples thereof are trifunctional and tetrafunctional mercaptans.

All of the stated CTAs may be used individually or in combination with one another. One specific embodiment relates to polymer dispersions which are prepared by free-radical emulsion polymerization without addition of a CTA.

To prepare the polymers it is possible to polymerize the monomers with the aid of initiators that form free radicals.

As initiators for the free-radical polymerization it is possible to employ the peroxo and/or azo compounds customary for this purpose, examples being alkali metal or ammonium peroxydisulfates, diacetyl peroxide, dibenzoyl peroxide, succinyl peroxide, di-tert-butyl peroxide, tert-butyl perbenzoate, tert-butyl perpivalate, tert-butyl peroxy-2-ethylhexanoate, tert-butyl permaleate, cumene hydroperoxide, diisopropyl peroxydicarbamate, bis(o-toluoyl) peroxide, didecanoyl peroxide, dioctanoyl peroxide, dilauroyl peroxide, tert-butyl perisobutyrate, tert-butyl peracetate, di-tert-amyl peroxide, tert-butyl hydroperoxide, azobisisobutyronitrile, 2,2'-azobis(2-amidinopropane) dihydrochloride or 2-2'-azobis(2-methylbutyronitrile). Mixtures of these initiators are suitable as well.

Among the initiators that can be used are reduction/oxidation (i.e., redox) initiator systems. The redox initiator systems are composed of at least one, usually inorganic, reducing agent and one organic or inorganic oxidizing agent. The oxidizing component comprises, for example, the initiators already specified above for the emulsion polymerization. In the case of the reducing components the compound in question comprises, for example, alkali metal salts of sulfurous acid, such as sodium sulfite, sodium hydrogensulfite, alkali metal salts of disulfurous acid such as sodium disulfite, bisulfite addition compounds of aliphatic aldehydes and ketones, such as acetone bisulfite, or reducing agents such as hydroxymethanesulfinic acid and its salts, or ascorbic acid. The redox initiator systems can be used along with soluble metal compounds whose metallic component is able to occur in a plurality of valence states. Typical redox initiator systems are, for example, ascorbic acid/iron(II) sulfate/sodium peroxodisulfate, tert-butyl hydroperoxide/sodium disulfite, tert-butyl hydroperoxide/Na hydroxymethanesulfinic acid. The individual components, the reducing component for example, may also be mixtures—for example, a mixture of the sodium salt of hydroxymethanesulfinic acid with sodium disulfite.

The amount of the initiators is generally 0.1% to 10% by weight, preferably 0.1% to 5% by weight, based on all of the monomers to be polymerized. It is also possible to use two or more different initiators in the emulsion polymerization.

The preparation of the polymer dispersion takes place typically in the presence of at least one surface-active compound. A comprehensive description of suitable protective colloids is found in Houben-Weyl, Methoden der organischen Chemie, volume XIV/1, Makromolekulare Stoffe, Georg Thieme Verlag, Stuttgart, 1961, pp. 411 to 420. Suitable emulsifiers are also found in Houben-Weyl, Methoden der organischen Chemie, volume 14/1, Makromolekulare Stoffe, Georg Thieme Verlag, Stuttgart, 1961, pages 192 to 208.

Suitable emulsifiers are anionic, cationic, and nonionic emulsifiers. As surface-active substances it is preferred to use emulsifiers, whose relative molecular weights are typically below those of protective colloids.

Useful nonionic emulsifiers are araliphatic or aliphatic nonionic emulsifiers, examples being ethoxylated mono-, di-, and trialkylphenols (EO degree: 3 to 50, alkyl radical: $C_4$-$C_{10}$), ethoxylates of long-chain alcohols (EO degree: 3 to 100, alkyl radical: $C_8$-$C_{36}$) and also polyethylene oxide/polypropylene oxide homopolymers and copolymers. These may comprise the alkylene oxide units copolymerized in random distribution or in the form of blocks. Highly suitable, for example, are EO/PO block copolymers. Preference is given to using ethoxylates of long-chain alkanols (alkyl radical $C_1$-$C_{30}$, average degree of ethoxylation 5 to 100) and, of these, particular preference to those having a linear $C_2$-$C_{20}$ alkyl radical and an average degree of ethoxylation of 10 to 50, and also ethoxylated monoalkylphenols.

Examples of suitable anionic emulsifiers are alkali metal salts and ammonium salts of alkyl sulfates (alkyl radical: $C_8$-$C_{22}$), of sulfuric monoesters with ethoxylated alkanols (EO degree: 2 to 50, alkyl radical: $C_{12}$-$C_{18}$) and with ethoxylated alkylphenols (EO degree: 3 to 50, alkyl radical: $C_4$-$C_9$), of alkylsulfonic acids (alkyl radical: $C_{12}$-$C_{18}$), and of alkylarylsulfonic acids (alkyl radical: $C_9$-$C_{18}$). Further suitable emulsifiers are found in Houben-Weyl, Methoden der organischen Chemie, volume XIV/1, Makromolekulare Stoffe, Georg-Thieme-Verlag, Stuttgart, 1961, pp. 192-208). Likewise suitable as anionic emulsifiers are bis(phenylsulfonic acid) ethers and/or their alkali metal or ammonium salts which carry a $C_4$-$C_{24}$ alkyl group on one or both aromatic rings. These compounds are general knowledge, from U.S. Pat. No. 4,269,749, for example, and are available commercially, in the form for example of Dowfax® 2A1 (Dow Chemical Company).

Suitable cationic emulsifiers are preferably quaternary ammonium halides, e.g., trimethylcetylammonium chloride, methyltrioctylammonium chloride, benzyl-triethylammonium chloride or quaternary compounds of N—$C_6$-$C_{20}$ alkylpyridines, -morpholines or -imidazoles, e.g., N-laurylpyridinium chloride.

The amount of emulsifier is generally about 0.01 to 10% by weight, preferably 0.1% to 5% by weight, based on the amount of monomers to be polymerized.

The neutralization of acid groups of the first polymer takes place preferably by at least partial feed of a neutralizing agent during the polymerization of the second stage, the neutralizing agent feed taking place preferably in parallel with the monomer feed. In this case the neutralizing agent may be added in a joint feed with the monomers to be polymerized, or in a separate feed. After all of the monomers have been fed in, the amount of neutralizing agent present in the polymerization vessel is preferably that required to neutralize at least 10%, preferably 30% to 100% or 30% to 90%, acid equivalents.

The emulsion polymerization takes place in general at 30 to 130° C., preferably at 50 to 95° C. The polymerization medium may be composed either only of water, or else of mixtures of water and water-miscible liquids such as methanol. It is preferred to use just water. The emulsion polymerization of the first stage may be carried out as a batch operation or else in the form of a feed process, including staged or gradient procedures. In the polymerization, a polymer seed is included in the initial charge, preferably, for more effective setting of the particle size.

The manner in which the initiator is added to the polymerization vessel in the course of the free-radical aqueous emulsion polymerization is known to a person of ordinary skill in the art. The initiator may either be included in its entirety in the initial charge to the polymerization vessel, or else used at the rate at which it is consumed in the course of the free-radical aqueous emulsion polymerization, continuously or in stages. In each specific case this is dependent on the chemical nature of the initiator system and also on the polymerization temperature. It is preferred to include part in the initial charge and to supply the remainder to the polymerization zone at the rate of its consumption. For removing the residual monomers, it is usual, after the end of the actual emulsion polymerization as well, i.e., after a monomer conversion of at least 95%, to add initiator. The individual components in the case of the feed process may be added to the reactor from above, in the side, or from below, through the reactor bottom.

In the case of emulsion polymerization, aqueous polymer dispersions generally with solids contents of 15% to 75% by weight are obtained, preferably of 40% to 75% by weight, more preferably of greater than or equal to 50% by weight. For a high space/time yield of the reactor, dispersions with a very high solids content are preferred. In order to be able to achieve solids contents >60% by weight, a bimodal or polymodal particle size ought to be set, since otherwise the viscosity becomes too high and the dispersion can no longer be managed. Producing a new generation of particles can be accomplished, for example, by addition of seed (EP 81083), by addition of excess amounts of emulsifier, or by addition of miniemulsions. A further advantage associated with the low viscosity and high solids content is the improved coating behavior at high solids contents. Producing one or more new particle generations can be done at any desired point in time. This point in time is guided by the target particle size distribution for a low viscosity.

Frequently it is advantageous if the aqueous polymer dispersion obtained after the end of the polymerization stages is subjected to an aftertreatment for the purpose of reducing the residual monomer content. In this case the aftertreatment takes place either chemically, as for example by completing the polymerization reaction by using a more effective radical initiator system (known as postpolymerization), and/or physically, as for example by stripping the aqueous polymer dispersion with steam or inert gas. Corresponding chemical and/or physical methods are familiar to the skilled person [see, for example, EP-A 771 328, DE-A 196 24 299, DE-A 196 21 027, DE-A 197 41 184, DE-A 197 41 187, DE-A 198 05 122, DE-A 198 28 183, DE-A 198 39 199, DE-A 198 40 586 and 198 47 115]. The combination of chemical and physical aftertreatments possesses the advantage that not only the unreacted ethylenically unsaturated monomers but also other disruptive volatile organic compounds (VOCs) are removed from the aqueous polymer dispersion.

In one embodiment of the invention, both stages use a silane monomer, such as, for example, vinyltrialkoxysilanes, e.g. vinyltrimethoxysilane, alkylvinyldialkoxysilanes, e.g., methylvinyldialkoxysilane, or (meth)acryloyloxyalkyltrialkoxysilanes, e.g., (meth)acryloyloxypropyltrimethoxysilane and (meth)acryloyloxypropyltriethoxysilane. These silane monomers can be used in amounts of up to 2% by weight, preferably 0.05% to 1% by weight, based on the total weight of the monomers.

The aqueous polymer dispersions obtainable by the process of the invention have polymer particles with a weight-average particle diameter $D_w$ in the range $\geq 50$ and $\leq 500$ nm, preferably $\geq 70$ and $\leq 300$ nm, and with particular preference $\geq 80$ nm to $\leq 200$ nm. The determination of the weight-average particle diameters is known to the skilled person and is accomplished, for example, via the method of the analytical ultracentrifuge. By weight-average particle diameter in this specification is meant the weight-average $D_{w50}$ value as determined by the method of the analytical ultracentrifuge (in this regard see S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell AUC Multiplexer: High Resolution Particle Size Distribution and Density Gradient Techniques, W. Mächtle, pages 147 to 175).

In addition, the corresponding polymer powders are obtainable from the aqueous polymer dispersion of the invention in a simple way (as for example by freeze drying or spray drying). These inventively accessible polymer powders may likewise be used as a component in the production of coating compositions for metal sheets.

The aqueous polymer dispersion typically has a solids content of 20% to 70% by weight, preferably 40% to 65% by weight.

The dispersion of the invention is used not only as it is but also with additions, for the purpose of the coating of metal sheets used for roof covering or as wall cladding. Such additions may include the following: an aromatic ketone such as benzophenone, according to DE-A 38 27 975, as a photoinitiator for the purpose of crosslinking with exposure to electromagnetic radiation, or a water-soluble dihydrazide, according to DE-A 39 01 073, when the polymer comprises carbonyl-containing monomers in copolymerized form.

Furthermore, the aqueous preparations employed in accordance with the invention may also comprise crosslinking additions. Additions of this kind may be as follows: aromatic ketones, e.g., alkyl phenyl ketones, optionally with one or more substituents on the phenyl ring, or benzophenone and substituted benzophenones as photoinitiators. Photoinitiators suitable for this purpose are known from DE-A 38 27 975 and from EP-A 417 568, for example. Suitable compounds with a crosslinking action are also water-soluble compounds having at least two amino groups, examples being dihydrazides of aliphatic dicarboxylic acids, according to DE-A 39 01 073, when the copolymer comprises carbonyl-containing monomers in copolymerized form.

In one embodiment of the present invention, the aqueous preparations are used in the form of pigmented and/or filled preparations. In this case the total copolymer content of the aqueous preparation is in the range from 10% to 60% by weight, preferably in the range from 20% to 50% by weight, and the auxiliaries content is in the range from 0.1% to 30% by weight and preferably in the range from 0.5 to 10% by weight, and the fillers and/or pigments content is in the range from 0.1% to 60% by weight and more particularly 0.2% to 50% by weight. The amount of pigments and/or fillers is generally between 0.5 and 150 parts by weight, based on 100 parts by weight of copolymer in the aqueous preparation. Furthermore, pigmented preparations will preferably also include a dispersant and/or wetting agent in addition to the film-forming assistants and the defoamers.

In particularly large numbers of instances, the aqueous dispersion of the polymer is employed in pigmented form for the coating of metal sheets used for roof covering or as wall cladding.

Typical white pigments are, for example, titanium dioxide, preferably in the rutile form, barium sulfate, zinc oxide or lithopones (zinc sulfide+barium sulfate). For decorative purposes the preparations may also comprise colored pigments, examples being yellow, red, brown, and black iron oxides, carbon black, graphite, zinc yellow, zinc green, ultramarine, manganese black, antimony black, manganese violet, Paris blue or Schweinfurt green.

As pigments (frequently also referred to as fillers), substances contemplated further include, for example, barium sulfate, talc, kaolin, feldspar, nepheline syenite, mica, calcium carbonate, dolomite, finely ground quartz, and mixtures thereof.

The pigmented paints and transparent varnishes used in accordance with the invention may comprise further customary auxiliaries, such as wetting agents, in-can preservatives, film preservatives, thickeners, defoamers, fungicides, algicides, flow promoters, and antifreeze agents, for example, in the conventional amounts.

Generally speaking, the amount of dispersant used is 0.5% to 6%, preferably 1% to 3%, by weight, based on the amount of the monomers to be polymerized free-radically.

The application rate of the aqueous polymer preparation to be applied for preservation is typically 50 to 400 g/m$^2$ (calculated on a wet basis). Application may take place in a conventional way, by spraying, troweling, knifing, rolling or pouring. It is important that the method of the invention can be employed, both with single coating and with double coating (wet on wet) on granulated or nongranulated metal sheets pre-primed with corrosion protection coatings.

EXAMPLES

1) Comparative Dispersion $T_g$(theo.)=44° C.

The components below were introduced into a polymerization vessel equipped with metering means and temperature regulation:

Initial charge:
    402.1 g water
    13.26 g 20% aqueous solution of $C_{16-18}$ fatty alcohol polyethoxylate
    8.71 g 45% aqueous solution of dodecyl diphenyl ether disulfonic acid sodium salt In a feed vessel, an emulsion was prepared from the following components:
    560.2 g water
    19.89 g 20% aqueous solution of $C_{16-18}$ fatty alcohol polyethoxylate
    34.85 g 45% aqueous solution of dodecyl diphenyl ether disulfonic acid sodium salt
    5.23 g 50% aqueous solution of 2-acrylamido-2-methylpropanesulfonic acid
    13.07 g 50% aqueous solution of acrylamide
    392.0 g n-butyl acrylate
    908.2 g methyl methacrylate In a third feed vessel the following feed was prepared:
Feed 3
    56.00 g 7% aqueous solution of sodium peroxodisulfate The initial charge was heated without the 50% aqueous solution of 2-acrylamido-2-methylpropanesulfonic acid to 95° C. (external temperature; polymerization temperature 90° C., stirring speed 150 rpm). The 50% aqueous solution of 2-acrylamido-2-methylpropanesulfonic acid was added and the mixture was stirred for 15 minutes. Then feed 1 and feed 2 were commenced. Feed 1 was metered in over 3 hours, feed 2 over 3.5 hours. The stirring speed was reduced back to 100 rpm, and stirring continued for 30 minutes.

Over the course of 30 minutes, 11.7 g of a 10% aqueous solution of tert-butyl hydroperoxide and 9.1 g of a 10% aqueous solution of hydroxymethanesulfinic acid were metered in. 2.61 of a 5% aqueous hydrogen peroxide solution were added, and the mixture was stirred for 10 minutes. After cooling, neutralization was carried out with 1.57 g of 25% aqueous $NH_3$, and 161.77 of water were added. This gave 2620 g of a 51.6% aqueous dispersion.

2) Comparative Dispersion (Two-Stage)(without Inventive Monomers I)

The components below were introduced into a polymerization vessel equipped with metering means and temperature regulation:

Initial Charge:
    389.7 g water
    51.07 g polystyrene seed latex (33% in water)

In a first feed vessel, an emulsion was prepared from the following components:
Feed 1
    323.9 g water
    9.7 g 20% aqueous solution of $C_{16-18}$ fatty alcohol polyethoxylate
    23.15 g 28% aqueous solution of sodium lauryl polyethoxysulfate
    9.07 g 50% aqueous solution of acrylic acid
    462.3 g n-butyl acrylate
    178.8 g methyl methacrylate In a second feed vessel, an emulsion was prepared from the following components:
Feed 2
    320.7 g water
    9.7 g 20% aqueous solution of $C_{16-18}$ fatty alcohol polyethoxylate
    23.15 g 28% aqueous solution of sodium lauryl polyethoxysulfate 10.37 g 50% aqueous solution of acrylamide
9.07 g 50% aqueous solution of acrylic acid
210.0 g n-butyl acrylate
431.0 g methyl methacrylate
In a third feed vessel the following feed was prepared:
Feed 3
55.6 g 7% aqueous solution of sodium peroxodisulfate The initial charge was heated (external temperature: 90° C., polymerization temperature: 83° C., stirring speed: 150 rpm). Feeds 1 and 3 were commenced simultaneously. Feed 1 was metered in over 1.5 hours, and then feed 2 over 1.5 hours. Feed 3 was metered in over 3 hours. This was followed by stirring for 30 minutes, after which, over the course of 1 hour, 11.7 g of a 10% aqueous solution of tert-butyl hydroperoxide and 9.1 g of a 10% aqueous solution of hydroxymethanesulfinic acid were metered in. This was followed by neutralization with 55.09 g of 2% aqueous NaOH, stirring for 10 minutes, reduction in the stirring speed to 100 rpm, and cooling. Thereafter 2.6 g of a 5% aqueous hydrogen peroxide solution and 78.78 g of water were added. This gave 2674 g of a 49.9% dispersion.

3) Exemplary Dispersion (Two-Stage), Inventive, with Monomers I

The components below were introduced into a polymerization vessel equipped with metering means and temperature regulation:
Initial Charge:
  389.7 g water
  51.07 g polystyrene seed latex (33% in water)
In a first feed vessel, an emulsion was prepared from the following components:
Feed 1
  323.9 g water
  9.7 g 20% aqueous solution of $C_{16-18}$ fatty alcohol polyethoxylate
  23.15 g 28% aqueous solution of sodium lauryl polyethoxysulfate
  9.07 g 50% aqueous solution of 2-acrylamido-2-methylpropanesulfonic acid
  462.3 g n-butyl acrylate
  178.8 g methyl methacrylate
In a second feed vessel, an emulsion was prepared from the following components:
Feed 2
  320.7 g water
  9.7 g 20% aqueous solution of $C_{16-18}$ fatty alcohol polyethoxylate
  23.15 g 28% aqueous solution of sodium lauryl polyethoxysulfate
  10.37 g 50% aqueous solution of acrylamide
  9.07 g 50% aqueous solution of 2-acrylamido-2-methylpropanesulfonic acid
  210.0 g n-butyl acrylate
  431.0 g methyl methacrylate
In a third feed vessel the following feed was prepared:
Feed 3
  55.6 g 7% aqueous solution of sodium peroxodisulfate The initial charge was heated (external temperature: 90° C., polymerization temperature: 83° C., stirring speed: 150 rpm). Feeds 1 and 3 were commenced simultaneously. Feed 1 was metered in over 1.5 hours, and then feed 2 over 1.5 hours. Feed 3 was metered in over 3 hours. This was followed by stirring for 30 minutes, after which, over the course of 1 hour, 11.7 g of a 10% aqueous solution of tert-butyl hydroperoxide and 9.1 g of a 10% aqueous solution of hydroxymethanesulfinic acid were metered in. This was followed by neutralization with 55.09 g of 2% aqueous NaOH, stirring for 10 minutes, reduction in the stirring speed to 100 rpm, and cooling. Thereafter 2.6 g of a 5% aqueous hydrogen peroxide solution and 78.78 g of water were added. This gave 2674 g of a 49.9% dispersion.

4) Exemplary Dispersion (Two-Stage), Inventive, with Monomers I, More Hard Phase The components below were introduced into a polymerization vessel equipped with metering means and temperature regulation:
Initial Charge:
  389.7 g water
  51.07 g polystyrene seed latex (33% in water)
In a first feed vessel, an emulsion was prepared from the following components:
Feed 1
  129.6 g water
  3.89 g 20% aqueous solution of $C_{16-18}$ fatty alcohol polyethoxylate
  9.26 g 28% aqueous solution of sodium lauryl polyethoxysulfate
  3.63 g 50% aqueous solution of 2-acrylamido-2-methylpropanesulfonic acid
  184.9 g n-butyl acrylate
  71.50 g methyl methacrylate
In a second feed vessel, an emulsion was prepared from the following components:
Feed 2
  515.0 g water
  15.56 g 20% aqueous solution of $C_{16-18}$ fatty alcohol polyethoxylate
  37.04 g 28% aqueous solution of sodium lauryl polyethoxysulfate
  10.37 g 50% aqueous solution of acrylamide
  14.52 g 50% aqueous solution of 2-acrylamido-2-methylpropanesulfonic acid
  336.0 g n-butyl acrylate
  689.6 g methyl methacrylate
In a third feed vessel the following feed was prepared:
Feed 3
  55.6 g 7% aqueous solution of sodium peroxodisulfate The initial charge was heated (external temperature: 90° C., polymerization temperature: 83° C., stirring speed: 150 rpm). Feeds 1 and 3 were commenced simultaneously. Feed 1 was metered in over 36 minutes, and then feed 2 over 2 hours 24 minutes. Feed 3 was metered in over 3 hours. This was followed by stirring for 30 minutes, after which, over the course of 1 hour, 11.7 g of a 10% aqueous solution of tert-butyl hydroperoxide and 9.1 g of a 10% aqueous solution of hydroxymethanesulfinic acid were metered in. This was followed by neutralization with 55.09 g of 2% aqueous NaOH, stirring for 10 minutes, reduction in the stirring speed to 100 rpm, and cooling. Thereafter 2.6 g of a 5% aqueous hydrogen peroxide solution and 78.78 g of water were added. This gave 2674 g of a 49.7% dispersion.

5) Exemplary Dispersion (Two-Stage), Inventive, with Monomers I, with Chain Transfer Agent and Crosslinker The components below were introduced into a polymerization vessel equipped with metering means and temperature regulation:

Initial Charge:
  389.7 g water
  51.07 g polystyrene seed latex (33% in water)
  In a first feed vessel, an emulsion was prepared from the following components:
Feed 1
  327.2 g water
  9.7 g 20% aqueous solution of $C_{16-18}$ fatty alcohol polyethoxylate
  23.15 g 28% aqueous solution of sodium lauryl polyethoxysulfate
  5.19 g 50% aqueous solution of acrylamide
  9.07 g 50% aqueous solution of 2-acrylamido-2-methylpropanesulfonic acid
  3.24 g 3-methacryloyloxypropyltrimethoxysilane
  465.4 g n-butyl acrylate
  175.7 g methyl methacrylate
  In a second feed vessel, an emulsion was prepared from the following components:
Feed 2
  331.7 g water
  9.7 g 20% aqueous solution of $C_{16-18}$ fatty alcohol polyethoxylate
  23.15 g 28% aqueous solution of sodium lauryl polyethoxysulfate
  5.19 g 50% aqueous solution of acrylamide
  9.07 g 50% aqueous solution of 2-acrylamido-2-methylpropanesulfonic acid
  7.78 g tert-dodecyl mercaptan
  1.30 g allyl methacrylate
  3.24 g 3-methacryloyloxypropyltrimethoxysilane
  207.5 g n-butyl acrylate
  432.2 g methyl methacrylate
  In a third feed vessel the following feed was prepared:
Feed 3
  55.6 g 7% aqueous solution of sodium peroxodisulfate
  The initial charge was heated (external temperature: 90° C., polymerization temperature: 83° C., stirring speed: 150 rpm). Feeds 1 and 3 were commenced simultaneously. Feed 1 was metered in over 1.5 hours, and then feed 2 over 1.5 hours. Feed 3 was metered in over 3 hours. This was followed by stirring for 30 minutes, after which, over the course of 1 hour, 11.7 g of a 10% aqueous solution of tert-butyl hydroperoxide and 9.1 g of a 10% aqueous solution of hydroxymethanesulfinic acid were metered in. This was followed by neutralization with 55.09 g of 2% aqueous NaOH, stirring for 10 minutes, reduction in the stirring speed to 100 rpm, and cooling. Thereafter 2.6 g of a 5% aqueous hydrogen peroxide solution and 69.18 g of water were added. This gave 2703 g of a 49.9% dispersion.

6) Standard, Comparative Dispersion, Single-Stage $T_g$(Theo.)=28° C.

The components below were introduced in a polymerization vessel equipped with metering means and temperature regulation:
Initial charge:
  200 g water
  35 g polystyrene seed latex (33% in water)
  3.4 g 7% aqueous solution of sodium peroxodisulfate
  In a feed vessel, an emulsion was prepared from the following components:
Feed 1.
  269.4 g water
  43.3 g 15% aqueous solution of sodium lauryl sulfate
  26 g 20% aqueous solution of $C_{12-14}$ fatty alcohol polyethoxylate
  19.5 g acrylic acid
  19.5 g 50% aqueous solution of acrylamide
  319.3.0 g n-butyl acrylate
  294.7 g styrene
  In a second feed vessel the following feed was prepared:
Feed 2
  46.00 g 7% aqueous solution of sodium peroxodisulfate
  The initial charge was heated to 95° C. (external temperature; polymerization temperature 90° C., stirring speed 150 rpm). After 5 minutes, feed 1 and feed 2 were commenced and were both metered in over 2.5 hours, with stirring for 30 minutes thereafter. The batch was neutralized with 54 g of 10% aqueous sodium hydroxide solution.
Performance Testing:
  Testing takes place with sheets only with the first paint coating, and also with the complete system (basecoat, granules, and final coat). Following application of the coating, the steel sheet, which is coated with an epoxy primer, is cured at room temperature (RT) for at least 24 hours. This is followed by testing of the adhesion at RT and after 24 hours of water storage. After brief drying, the samples are frozen at –20° C. for 24 hours. This is followed immediately by a hammer blow test and by the flexural test with 180° bending.
  The adhesion is evaluated using a scale of 1-5, with 1 representing optimum adhesion, with no conspicuities, and 5 representing detachment without further mechanical influence. In the case of the flexure and the hammer blow test, the cracking and delamination are likewise evaluated with a scale of 1-5. The rating 1 here denotes virtually no delamination and cracking, and rating 5 denotes complete delamination at the test point.
Flexural Test
  The flexural test takes place at –10° C. It involves bending the metal sheet by 180° C. with the coating outward. Thereafter the adhesion of the coating to the substrate, particularly in the region of the bending, is evaluated.
  Hammer blow test (along the lines of the notched impact flexural test according to EN1004b, but without a notch and only manually with a hammer).
  In the hammer blow test, a sheet at a temperature of –10° C. receives a blow on its reverse face with a pointed hammer. The coating is subsequently inspected for the quality of its adhesion on the front face in the region of the deformation.
Weathering Stability
  To test the weathering stability of the paints on the metal sheets, a Xenon test is carried out for paints in accordance with DIN EN ISO 11341 (cycle A), and inspection takes place after 500 hours in each case. In this Xenon test, coated metal sheets with a size of 5*13 cm are each illuminated in alternation for 102 minutes dry and for 18 minutes during which the sheets are dampened with a fine water mist. The relative humidity is set at 50% and the black standard temperature is 65° C. The irradiation power corresponds to 60 W UV light at 300-400 nm or 0.51 W/($m^2$·nm) at a 340 nm light wavelength.
  Damage criteria assessed are visible paint damage, such as cracks or delamination, color changes, and loss of gloss. The paint's gloss is measured with a gloss meter at a 60° angle before and after the weathering test.
  In order to determine the performance properties of the dispersions of the invention, paints were produced to the following formula:

TABLE 1

| Formulation | | Standard (Example 6) | Example 5 |
|---|---|---|---|
| Water | | 68.61 | 80 |
| Standard (Example 6) | | 39.13 | |
| Pigmentverteiler ® NL | BASF SE | 2.45 | 3.0 |
| Tego Airex ® 902 W | Defoamer from Evonik; | 2.94 | 4.0 |
| DPnB/BDG, 1:1 (dipropylene glycol n-butyl ether (Solvenon DPnB, BASF) and BDG | Dow Chemical | | |
| Calcilit Extra | Alpha Calcit | 216.38 | 215 |
| Bayferrox ® black 318 | Lanxess, Krefeld | 71.91 | 70 |
| Lusolvan ®FBH | BASF SE | 23.48 | |
| Diethylhexyl phthalate | BASF SE | 20.54 | |
| Standard (Example 6) | | 550.65 | |
| Example 5 | | | 585 |
| Tego Airex ®902W | | 3.91 | 3 |
| DPnB/BDG, 1:1 | | | 30 |
| Viscalex ®HV30 | BASF SE, thickener | | 10 |
| | | 1000 | 1000 |
| PVC: | | 25.25 | 25.22 |
| SC: | | 58.3 | 57.8 |

The paints were knife-coated onto primed metal sheets, with a wet film thickness of 300 μm. The sheets had been primed with an epoxy coating. One cohort of the sheets is dried for 3 hours in a drying cabinet at 40° C. and then for 3 days at room temperature, and subsequently tested. The second cohort of the sheets is subjected directly to further processing. The granules are scattered into the paint while it is still wet, and the sheet is tapped to remove excess granules. This is followed immediately by coating with a clearcoat (130-180 g/m²) based on a crosslinked straight acrylic (Acronal®8974). Drying then takes place likewise, in the same way.

Sheet Testing without Granules Example 6 Example 5

| | Example 6 | Example 5 |
|---|---|---|
| Adhesion RT | 3 | 1 |
| Adhesion after 24 h water | 4 | 2.5 |
| Hammer blow after 24 h −20° C. | 2 | 2 |
| Flexural test after 24 h −20° C. | 1 | 1 |

Sheet Testing with Granules and Clearcoat Example 6 Example 5

| | Example 6 | Example 5 |
|---|---|---|
| Adhesion RT | 2 | 1 |
| Adhesion after 24 h water | 4 | 2 |
| Hammer blow after 24 h −20° C. | 2 | 2 |
| Flexural test after 24 h −20° C. | 5 | 2 |

Sheet Testing without Granules Example 6 Example 5

| | Example 6 | Example 5 |
|---|---|---|
| Adhesion RT | 3.5 | 1 |
| Adhesion after 24 h water | 4.5 | 2.5 |
| Hammer blow after 24 h −20° C. | 3 | 2 |
| Flexural test after 24 h −20° C. | 4 | 1.5 |

Weathering Test

After 2600 hours of Xenotest: no differences are perceptible. The weather resistance is comparable with that of the current market systems (valid for the entire system construction).

Pendulum Hardness

The coating under test was knife-coated using an Erichsen film-drawing apparatus (200 μm wet) onto a 38×7 cm glass plate. After 1 day of drying at room temperature or 30 minutes at 60° C. and 1 day of room temperature, three pendulum test measurements were conducted at three points on the glass plate. Measurement took place by the method of König (DIN EN ISO 1522).

Measurements were performed after 1 day, 4 days, 6 days, and 14 days. The results found correspond to the average value from each of the 3 measurements.

The test shows that with the new binder, it is possible to produce coatings which are significantly less soft and tacky, despite high flexibility and good adhesion.

| | 1 d | 4 d | 6 d | 14 d |
|---|---|---|---|---|
| Pendulum hardness (in sec.) | | | | |
| Standard (Example 6) | 9.3 | 9.4 | 9.4 | 9.8 |
| New binder (Example 5) | 15.4 | 19.1 | 22.9 | 27.1 |
| Film on glass 200μ drying at room temperature | | | | |
| Standard (Example 6) | 9.8 | 9.8 | 9.8 | 9.8 |
| New binder (Example 5) | 15.4 | 19.1 | 22.4 | 27.5 |
| Film on glass 200μ drying for 30 min at 60° C., further drying at room temperature | | | | |

The invention claimed is:

1. A method of coating a metal sheet, comprising:
   coating the surface of the metal sheet with an aqueous multistage polymer dispersion obtained by free-radically initiated aqueous emulsion polymerization,
   wherein the aqueous multistage polymer dispersion comprises a soft phase, a hard phase and a hard-to-soft stage ratio of 25% to 95% by weight to 75% to 5% by weight,
   wherein the soft phase, as a first stage has a glass transition temperature (Tg) of −30 to 0° C.,
   wherein the hard phase, as a second stage, has a glass transition temperature of 20 to 60° C., and
   wherein the aqueous multistage polymer dispersion comprises at least one monomer of the general formula I:

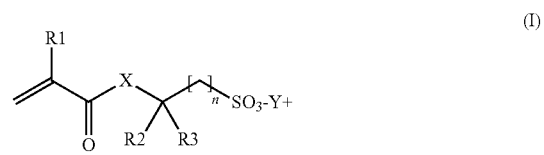

in which:
n=0 to 2,
R1, R2, R3=independently of one another hydrogen or methyl group,
X=O or NH, and
Y=H, alkali metal, $NH_4$.

2. The method according to claim 1, wherein the aqueous polymer dispersion is present on a profiled metal roofing element.

3. The method according to claim 1, wherein the aqueous polymer dispersion is present as a basecoat and/or a topcoat on a metal sheet.

4. The method according to claim 1, wherein the hard-to-soft stage ratio is 25-95:75-5.

5. The method according to claim 1, wherein
   the first stage is a copolymer which (i) is present in an amount of 5% to 50% by weight, based on 100 parts by weight of the total monomers to be polymerized in the first and second stages, (ii) comprises 80% to 99% by weight of principal monomers selected from the group consisting of C1 to C10 alkyl(meth)acrylates, amides and hydroxyalkyl esters of $\alpha,\beta$-unsaturated $C_3$-$C_6$ carboxylic acids, and mixtures thereof, and (iii) comprises 0.1% to 5% by weight of the monomer of the general formula I.

6. A metal sheet comprising on at least one surface thereof, the aqueous multistage polymer dispersion according to claim 1.

7. The metal sheet according to claim 6, wherein the sheet is granulated.

8. The metal sheet according to claim 6, wherein the metal sheet comprises aluminum, zinc, copper or steel.

9. The metal sheet according to claim 6, wherein the metal sheet is a profiled metal roofing element.

10. The metal sheet according to claim 6, wherein the metal sheet is a roof covering or a wall cladding.

11. The metal sheet according to claim 6, wherein the aqueous polymer dispersion is present as a basecoat and/or a topcoat on the metal sheet.

12. A method for coating a granulated metal sheet, the method comprising:

coating the surface of the granulated metal sheet with a first paint layer of 100 to 800 μm thick comprising a polymer dispersion comprising at least one monomer of the formula I, scattering a layer of granules into the first paint layer while the first paint layer is still wet, and coating the layer of granules with a second paint layer comprising a polymer dispersion comprising at least one monomer of the formula I or with a transparent clearcoat,

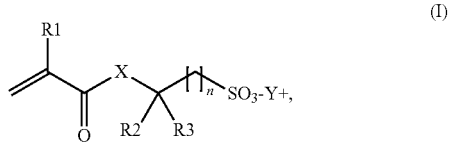

wherein:
n=0 to 2,
R1, R2, R3 each independently is hydrogen or a methyl group,
X is O or NH, and
Y is H, alkali metal, or $NH_4$,
wherein the polymer dispersions of the first and second paint e same or different,
wherein the polymer dispersions of the first and second paint layers comprise a soft phase, a hard phase and a hard-to-soft stage ratio of 25% to 95% by weight to 75% to 5% by weight,
wherein the soft phase, as a first stage has a glass transition temperature (Tg) of −30 to 0° C., and
wherein the hard phase, as a second stage, has a glass transition temperature of 20 to 60° C.

13. A method for coating an ungranulated metal sheet, comprising:

coating the surface of the ungranulated metal sheet with a paint layer of 100 to 800 μm thick comprising the polymer dispersion according to claim 1.

* * * * *